(12) United States Patent
Sharma (10) Patent No.: US 10,339,134 B2
(45) Date of Patent: *Jul. 2, 2019

(54) SYSTEM, METHOD, AND NON-TRANSITORY COMPUTER-READABLE STORAGE MEDIA FOR GENERATING NORMALIZATION CANDIDATES FOR A SEARCH QUERY

(71) Applicant: Walmart Apollo, LLC, Bentonville, AR (US)

(72) Inventor: Monadhika Sharma, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 521 days.

This patent is subject to a terminal disclaimer.

(21) Appl. No.: 14/871,504

(22) Filed: Sep. 30, 2015

(65) Prior Publication Data

US 2017/0091266 A1 Mar. 30, 2017

(51) Int. Cl.
*G06F 16/28* (2019.01)
*G06F 16/242* (2019.01)
*G06F 16/951* (2019.01)

(52) U.S. Cl.
CPC ........ *G06F 16/2425* (2019.01); *G06F 16/285* (2019.01); *G06F 16/951* (2019.01)

(58) Field of Classification Search
CPC ......... G06F 17/30395; G06F 17/30457; G06F 17/30598

USPC ......................................................... 707/768
See application file for complete search history.

(56) References Cited

U.S. PATENT DOCUMENTS

| 8,027,990 | B1 * | 9/2011 | Mysen et al. | 707/766 |
| 8,782,069 | B2 * | 7/2014 | Jockish et al. | 707/759 |
| 2016/0253418 | A1 * | 9/2016 | Sharma | G06F 16/3322 707/767 |
| 2016/0321365 | A1 * | 11/2016 | Duan et al. | 707/727 |

\* cited by examiner

*Primary Examiner* — Jean B Fleurantin
(74) *Attorney, Agent, or Firm* — Bryan Cave Leighton Paisner LLP

(57) ABSTRACT

A system for generating normalization candidates for a search query includes a database for storing session logs with each session log including query data and a processor in communication with the database and configured to execute computer-readable instructions causing the processor to analyze session log data to generate sets of query reformulations for a plurality of search queries, select one of the sets containing a normalization candidate that matches the search query, filter the selected set of reformulations, tie the candidates in the selected set to a category, compare the categories of the candidates, remove at least one reformulation from the selected set when the category of one candidate is uncommon with the category of the other candidate, and store the remaining candidates in the database. A method and one or more non-transitory computer-readable storage media for generating stemming pairs for a search query are also disclosed.

22 Claims, 3 Drawing Sheets

SYSTEM, METHOD, AND NON-TRANSITORY COMPUTER-READABLE STORAGE MEDIA FOR GENERATING NORMALIZATION CANDIDATES FOR A SEARCH QUERY

FIELD OF THE DISCLOSURE

The present disclosure relates generally to a system, method, and non-transitory computer-readable storage media for generating normalization candidates for a search query.

BACKGROUND

Online shopping is a form of electronic commerce where goods and/or services can be bought, purchased, and/or traded using the Internet. For example, the goods and/or services may be located online by entering a search query into a web search engine, and allowing the search engine to search the Internet for the goods and/or services identified in the search query.

Web search engines typically rely on text matching for locating relevant goods and/or services on the Internet. For example, the search engine may return particular items that are an exact match with the search query. However, in some instances, multiple users may formulate similar search queries when looking for different goods and/or services. For example, a first user may formulate the search query "apples" when searching for the grocery item apples, while a second user may formulate the search query "apple" when searching for electronic devices manufactured by Apple, Inc. In instances where the user enters the search query "apple" intending to find the grocery item "apples", the user may have a poor search experience if the search engine returns electronic devices rather than grocery items.

Query normalization is an out-of-the-box ontology technique for formulating stemming pairs for a search query. However, this ontology technique may not be able to recognize specific brand names, specific product names, and/or retail-specific jargon. In addition, query normalization, which relies on text-matching, may generate results corresponding to that particular search query only. However, the user may have entered the search query with an intent to locate items other than what the search engine located, utilizing text-matching, for that particular the search query. For instance, the user may have entered the query "chair" with the intent of locating dining room chairs and the search engine (utilizing query normalization) may have located office chairs instead. This may lead to a poor search experience by the user. Therefore, query normalization based on text-matching alone, and as currently used, may not be able to generate most, if not all suitable items based on a particular search query.

The present disclosure is aimed at solving the problems identified above.

SUMMARY

A system for generating normalization candidates for a search query includes a database for storing a plurality of session logs with each session log including query data and a processor in communication with the database and configured to execute computer-readable instructions causing the processor to: analyze the query data of the plurality of session logs to generate a plurality of sets of query reformulations for each of a plurality of search queries; select one of the plurality of sets of query reformulations containing a normalization candidate that matches the search query; filter the selected set of query reformulations; tie the normalization candidates of each of the query reformulations of the selected set to a category; compare the categories of the normalization candidates of each of the query reformulations of the selected set; remove at least one query reformulation from the selected set when the category of one of the normalization candidates is uncommon with the category of the other normalization candidate; and store the normalization candidates of the query reformulations remaining in the set in the database.

A method for generating normalization candidates for a search query is also disclosed, with one or more steps of said method being performed utilizing a processor. The method comprises the steps of: analyzing the query data of the plurality of session logs to generate a plurality of sets of query reformulations for each of a plurality of search queries; selecting one of the plurality of sets of query reformulations containing a normalization candidate that matches the search query; filtering the selected set of query reformulations; tying the normalization candidates of each of the query reformulations of the selected set to a category; comparing the categories of the normalization candidates of each of the query reformulations of the selected set; removing at least one query reformulation from the selected set when the category of one of the normalization candidates is uncommon with the category of the other normalization candidate; and storing the normalization candidates of the query reformulations remaining in the set in the database.

Also disclosed is one or more non-transitory computer-readable storage media having computer-executable instructions embodied thereon and, when executed by a processor, causes the processor to: analyze the query data of the plurality of session logs to generate a plurality of sets of query reformulations for each of a plurality of search queries; select one of the plurality of sets of query reformulations containing a normalization candidate that matches the search query; filter the selected set of query reformulations; tie the normalization candidates of each of the query reformulations of the selected set to a category; compare the categories of the normalization candidates of each of the query reformulations of the selected set; remove at least one query reformulation from the selected set when the category of one of the normalization candidates is uncommon with the category of the other normalization candidate; and store the normalization candidates of the query reformulations remaining in the set in the database.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment of example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments and/or examples in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system". Furthermore, the present disclosure may take the form of a computer program product embodied in any tangible media or expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisional via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagram(s) in the flow diagram(s) illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with" or "configured to be in communication with". This terminology is intended to be non-limiting, and where appropriate, be interpreted to include without limitation, wired and wireless communication using any one or a plurality of suitable protocols, as well as communication methods that are constantly maintained, are made on a periodic basis, and/or made or initiated on an as needed basis.

The present disclosure particularly describes how to generate an accurate and usable set of normalization candidates for a search query entered into a web search engine, where each normalization candidate can be used by the web search engine to accurately find, locate, and/or recall relevant goods, services, and/or topics/points of interest. For example, the present disclosure describes generating a plurality of query reformulations utilizing query data from stored session logs and filtering the plurality of query reformulations to generate useful and accurate normalization candidates for the search query. Accordingly, the system, method, and non-transitory computer-readable storage media of the present disclosure transforms a search query into a relevant, accurate, and useful set of normalization candidates which may be used to find, locate, and/or recall relevant goods, services, and/or topics/points of interest. Typically, the set of normalization candidates includes the search query. Accordingly, the web search engine can locate more goods, services, and/or topics/points of interest for a given search query than just those that would have otherwise been generated with text-matching alone. In this way, a given search query which is similar but may not be directly on-point with the desired results can still be entered into the web search engine to find, locate, and/or recall the desired results without having to change the search query. This leads to more efficient web searching by the user and efficient retrieval of relevant search results by the web search engine.

With reference to the figures and in operation, the present disclosure provides a system 10, a method, and one or more non-transitory computer-readable media for generating normalization candidates for a search query entered into a web search engine.

Figure 1:
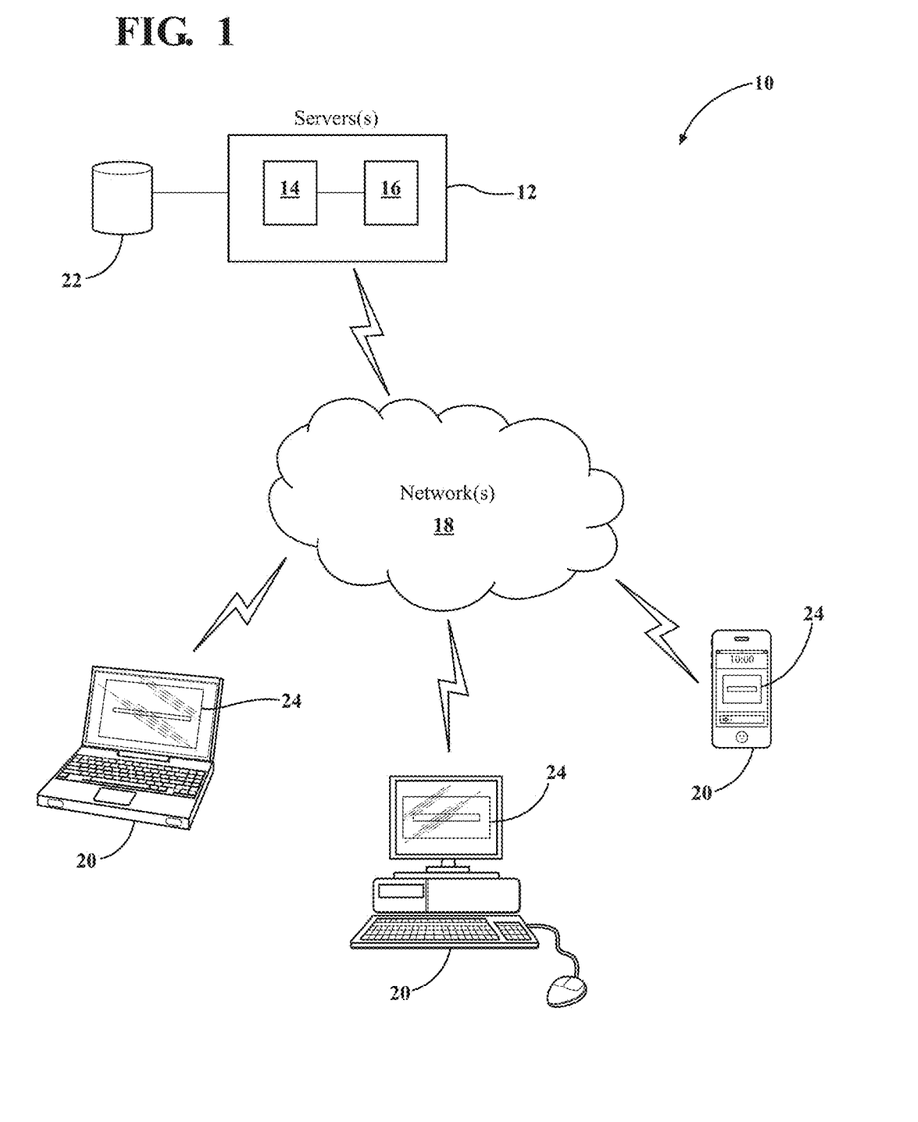
FIG. 1 is a schematic illustrating an example of a system for generating normalization candidates for a search query.

An example of a system 10 which is usable for generating normalization candidates for a search query is shown in FIG. 1. The system 10 includes at least one server 12 with a processor 14 and a memory 16 operatively associated and in communication with the processor 14. The processor 14 may be a controller, a microcontroller, a microprocessor, an application specific integrated circuit (ASIC), or a processor working in conjunction with a central processing unit (CPU) performing the function of a general purpose computer. The processor 14 is configured to execute computer programs containing computer-readable and executable instructions for performing one or more steps of the method for generating normalization candidates for a search query. In an example, the processor 14 is configured to execute a computer program containing computer-readable and executable instructions for performing all of the steps of a method for generating normalization candidates for a search query. The memory 16 may include a read only memory (ROM) and random access memory (RAM) for storing the computer-readable instructions for performing the step(s) of the method.

The system 10 further includes one or more communication network(s) 18 that enable communication between the server(s) 12 and one or more computing devices 20. In an example, the computing device 20 includes any suitable device that enables a user to access and communicate with the system 10. The computing device 20 also includes any suitable device that enables the user to access the Internet and to perform desired web-based searching utilizing, for example, a web search engine. Typically, the user accessing a webpage 24 associated with the web search engine, and enters his/her search query into a search or text box set forth on the webpage 24. Non-limiting examples of computing devices 20 include a laptop or notebook computer, a desktop computer, a tablet computer, a personal data assistant (PDA), an Internet-enabled mobile telephone (such as a smartphone), a hand-held mobile device such as a cellular phone, and/or the like.

The communication network(s) 18 may be used to establish any wired and/or wireless connections. Non-limiting examples of communication network(s) 18 include the Internet, a file transfer protocol (FTP), an Intranet, a local area network (LAN), a virtual private network (VPN), a cellular network, and a wide area network (WAN). The various communication networks 18 may be used alone or in conjunction with one another.

As shown in FIG. 1, the system 10 further includes a database 22 coupled to the server(s) 12 and in operative and selective communication with the processor 14. In an example, the processor 14 collects data, such as query data of a web searching or query session, and organizes the query data into appropriate session logs. The session logs (each of which contains query data of the respective query session) are stored in the database 22. Further details of the query data, query session, and session logs are set forth below.

Examples of a method for generating normalization candidates for a search query are described below with reference to FIGS. 2-3. It is to be understood that the examples of the method described below includes a plurality of steps, which may be performed independently of, or in combination with other steps of the method. Furthermore, the steps of the method may be performed by one or a combination of components of the system 10.

At the outset, a session is typically initiated when a user accesses the webpage 24 of the web search engine on the Internet (utilizing, e.g., the computing device 20 which is accessible to the Internet through one or more of the communication network(s) 18), and enters a search query into the web search engine. Typically, the search query includes one or more terms, which is/are entered as text into a search box on the webpage 24 of the web search engine. The search query generally describes or intends to describe a particular item, such as a good and/or service. In some instances, the search query describes or intends to describe a topic and/or a point of interest for purposes of obtaining information pertaining to the topic of interest and/or the point of interest. For example, a search query may include the term "beds" describing or intending to describe bed frames. In another example, the search query may include the terms "dog grooming supplies" to describe or intend to describe grooming supplies for dogs. In yet another example, the search query may include the terms "northern Michigan" to describe or intend to describe the upper peninsula of Michigan as a point of interest.

A session typically remains active for so long as there is interaction between the user and the web search engine. For example, the session may remain active for so long as the user is actively searching for a particular good, a particular service, and/or a particular topic or point of interest, such as by entering new or reformulated search queries into the web search engine, scrolling through results of a search based on a particular search query, selecting to view a webpage associated with one or more of the search results based on the search query, and/or the like. The session may remain active, for example, for a predetermined amount of time (such as for 15 minutes, 25 minutes, 1 hour, etc.) after the interaction between the user and the web search engine stops. For instance, the session may end 15 minutes after the user entered his/her last search query into the web search engine. The session may also end after the user closes and/or leaves the webpage 24 of the web search engine, such as by accessing another webpage or closing his/her Internet browser.

A new session may be initiated after the previous session has ended. This may occur, for example, by entering a new search query into the web search engine after the previous session has lapsed. A new session may also be initiated upon accessing the webpage 24 of the web search engine after the user previously left the webpage and/or closed his/her Internet browser. The new session may remain active for so long as there is interaction between the user and the web search engine, as described in detail above.

Figure 2:
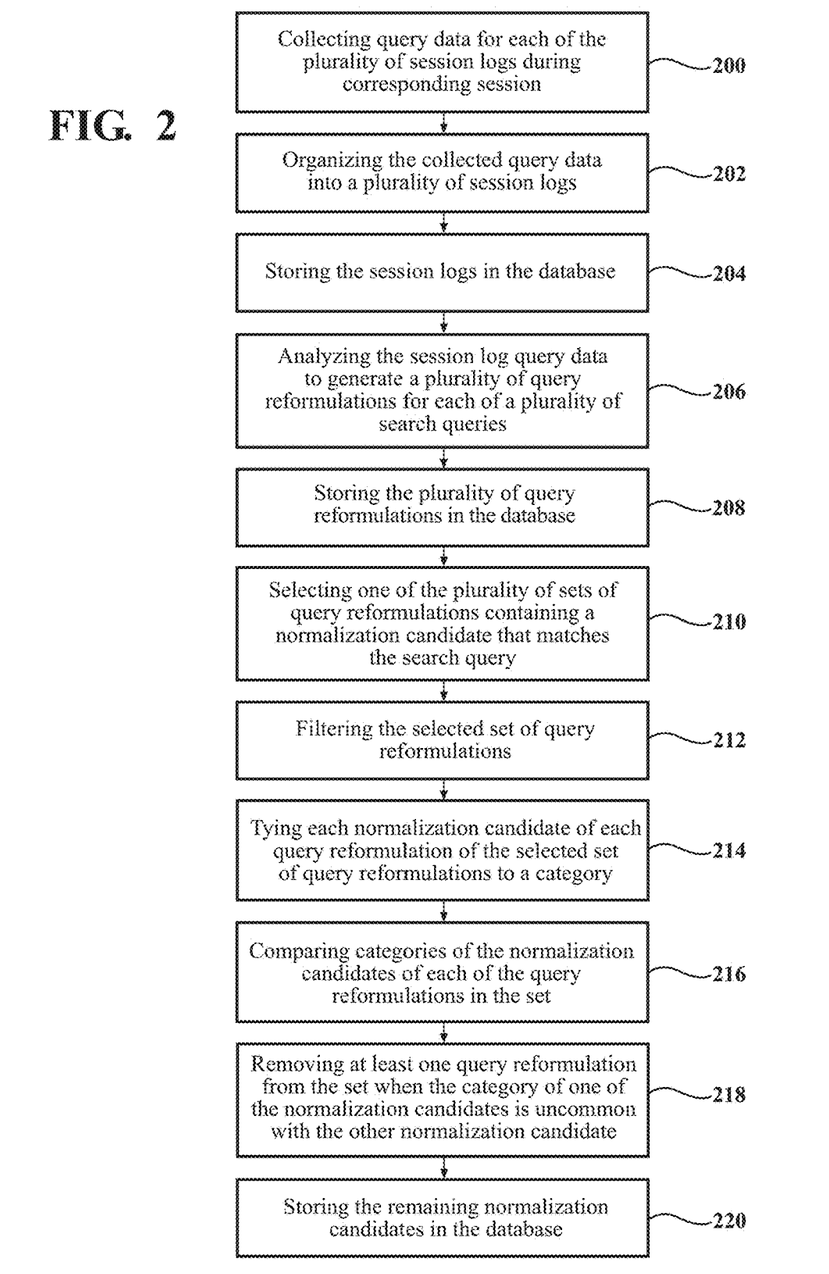
FIG. 2 is a flowchart of an example of a method for generating normalization candidates for a search query.
Figure 3:
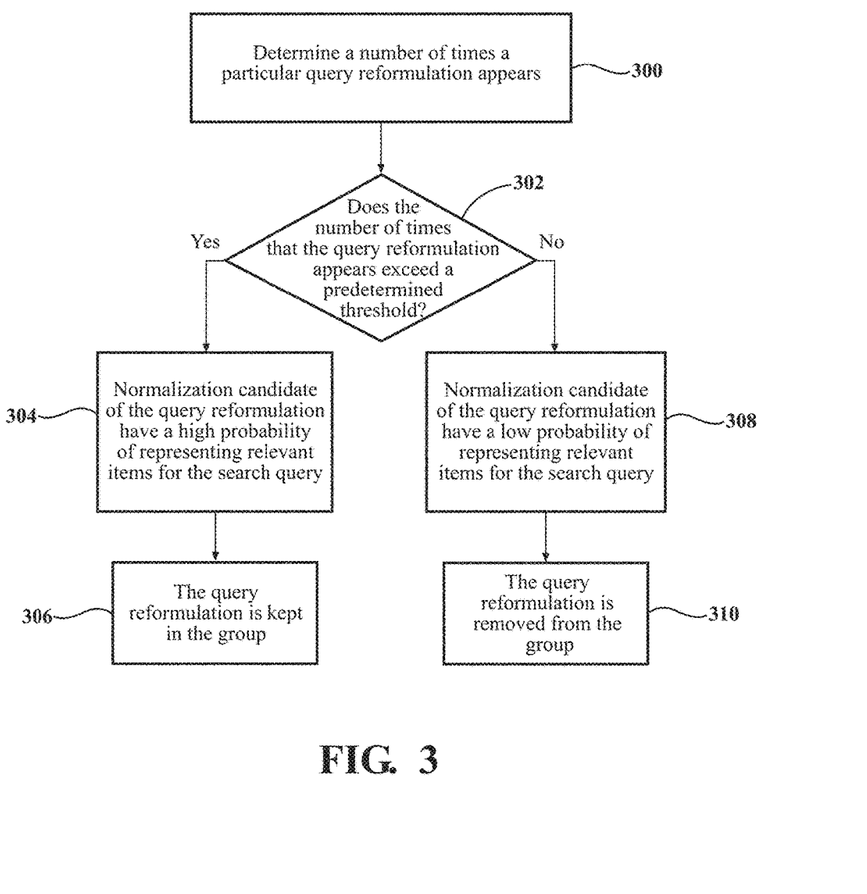
FIG. 3 is a flowchart of an example of a sub-process of the method of FIG. 2.

As shown in FIG. 2, the method includes collecting query data for each of the plurality of session logs during a corresponding session (as shown in method step 200). In an example, the query data for each session may be collected by the processor 14 from the web search engine in real time, such as while the user is performing his/her search utilizing the web search engine. Alternatively, the query data for each session may be collected by the processor 14 periodically. For example, the processor 14 may collect the query data at the end of a predetermined time interval (such as at the end of every 1 minute, every 5 minutes, etc.). In another example, the processor 14 may collect the query data in response to a trigger (such as upon detecting when the session ends, detecting when the user closes his/her Internet browser, etc.).

The method further includes organizing the collected query data into the plurality of session logs (as shown in method step 202) and storing the session logs in the database 22 (as shown in method step 204). In an example, the processor 14 organizes the query data by separating the query data collected from the web search engine into their corresponding sessions. Once separated, the query data for each session is stored in a session log in the database 22. It is to be understood that a particular session log includes the query data from its corresponding session. Further, since the session cannot be reopened, the session logs stored in the database 22 are not updated. Typically, session logs are maintained in the database 22 for a preset amount of time, such as for 6 months, 1 year, etc. After the preset amount of time lapses, the session log may be removed and/or deleted from the database 22.

It is further to be understood that the processor 14 continuously collects query data for each session utilizing the web search engine. To this end, the processor 14 also continuously organizes the query data into a respective session log and stores the session logs in the database 12. Accordingly, the database 22 is dynamically updated with new session logs. Furthermore, older session logs are dynamically removed from the database 22 after the preset amount of time lapsed, as mentioned above.

Typically, a single session log may be created for each session, and the session log includes the query data collected while the session was active. The query data may include search query/ies that was/were entered into the web search engine while the session was active. The query data may also include user feedback data, such as an identification of the goods, services, and/or topics/points of interest which were the included in the search results and viewed by the user. In an example, the user may view the goods, services, and/or topics/points of interest by accessing one or more webpages associated with the goods, services, and/or topics/points of interest, such as by selecting (e.g., by a mouse click) one or more icons and/or hyperlinks displayed on the web search engine results page that connect or link to the webpage(s) associated with the goods, services, and/or topics/points of interest.

As shown in FIG. 2, the method further includes analyzing the session log query data to generate a plurality of query reformulations for each of a plurality of search queries (as shown in method step 206) and storing the plurality of query reformulations in the database 22 (as shown in method step 208). In an example, the processor 14 analyzes the collected query data to identify pairs of normalization candidates; i.e., the search query and a reformulation of the search query. For instance, the user may enter an initial search query "chair" into the web search engine. After reviewing the results generated by the search engine based on the initial search query "chair" and determining that the results did not contain desired good(s), service(s), and/or topic(s)/point(s) of interest, the user may change the initial search query by entering a subsequent search query such as "chairs". By changing the initial search query "chair" to the subsequent search query "chairs", the user has reformulated the search query. Accordingly, the pair of normalization candidates contains the initial search query "chair" and the subsequent search query "chairs", and the pair of normalization candidates may be referred to as a query reformulation.

In some instances, the query reformulation may contain an initial search query and a subsequent search query containing the root of the initial search query. For example, the initial search query may be "chair" and the subsequent search query contains the root of the initial search query, such as "chairs". In such instances, the query reformulation may be referred to as a stemming pair. Typically, the stemming pair contains initial and subsequent search queries that are substantially the same but may be represented by different spellings or acronyms. The stemming pair may also typically contain initial and subsequent search queries with one of the queries being the plural and the other query being the singular.

In an example, each query reformulation based on a particular search query may be dropped or placed by the processor 14 into a first corresponding group or set of query reformulations which is stored in the database 22. Additional query reformulations based on the particular search query may be added to the group or set each time the processor 14, during the analyzing step 206, comes across a new query reformulation having at least one of the initial and subsequent search queries that is substantially the same one of the query reformulations in the group or set that is stored in the database 22. For example, a group or set of query reformulations may include a first query reformulation "chair" and "chairs" and a second query reformulation "chair" and "chrs", and the processor 14 may identify another query reformulation "chair" and "arm chair". Since "chair" is already present in the first query reformulation, the processor 14 drops the query reformulation "chair" and "arm chair" into that group or set of reformulations. In another example, the processor 14 may identify another query reformulation "cushions" and "seat covers". In this example, neither "cushions" nor "seat covers" is present in the group or set of reformulations and therefore the processor 14 drops the query reformulation "cushions" and "seat covers" into another group or set of query reformulations. Alternatively, the processor 14 may create another group or set of query reformulations containing the query reformulation "cushions" and "seat covers".

It is to be understood that the processor 14 determines every query change that occurred during a respective session of the session logs. Further, each session may have a number of different query changes. For example, one session may have a first query change where the search query "chair" was changed to the search query "chrs" and a second query change where the search query "chrs" was changed to the search query "chairs".

It is further to be understood that in instances where the online traffic of the web search engine is high, the processor 14 analyzes a large number of session logs and, as a result, may identify many (e.g., hundreds or thousands of) query reformulations. Furthermore, since there are various products, services, and/or topics/points of interest which are available to the users, many (e.g., hundreds or thousands of) different search queries may be entered into the web search engine by the users. Accordingly, many (e.g., hundreds or thousands of) groups or sets of query reformulations may be created by the process described above.

An example of a process, performed by the processor 14 while executing computer-readable instructions of a computer program, for managing sets of query reformulations is described in detail below with reference to FIG. 3. In this example, the processor 14 analyzes session log query data to determine which query reformulations have a frequency of occurring that exceeds a predetermined threshold. The processor 14 determines the number of times a particular query reformulation appears in a particular set of query reformulations (as shown in method step 300 in FIG. 3). Said differently, the processor 14 determines the frequency of a particular query change made by users of the web search engine. The number of times the query reformulation appears in the set is then compared to a predetermined threshold (as shown in method step 302). The predetermined threshold is typically preset, and is typically set based on the item (e.g., the good, service, and/or topic/point of interest) pertaining to the normalization candidates of the query reformulation. For web search engines having higher traffic, the predetermined threshold may be set to a high value (such as, e.g., 50). However, for web search engines having lower traffic, the predetermined threshold may be set to a low value (such as, e.g., 5). It is to be understood that the predetermined threshold may be changed depending, at least in part, on the amount of traffic the search engine has and/or the type of item that the user is searching for.

In instances where the number of times that query reformulation appears exceeds the predetermined threshold, the normalization candidates of the query reformulation are considered to have a high probability of representing relevant items for the search query (e.g., relevant goods, services, and/or topics/points of interest), as shown in method step 304. For example, if the threshold is five and the queries of the query reformulation appears six times, then the normalization candidates of the query reformulation are considered to frequently occur and therefore, the normalization candidates of the query reformulation are likely to be used to locate relevant items during the search. In this scenario, the normalization candidates of the query reformulation are kept in that particular set of query reformulations (as shown in method step 306). Alternatively, where the number of query reformulations of the set does not exceed the predetermined threshold, the query reformulation is considered to have a low probability of representing relevant items for the search query (as shown in method step 308). For example, if the threshold is five and the queries of the query reformulation appear three times in the set, then the query reformulation is considered to not frequently occur (i.e., considered to be infrequent) and therefore, the normalization candidates of the query reformulation are not likely to be used to find relevant items for the search. In this scenario, the query reformulation is removed from the group (as shown in method step 310). Typically, the query reformulation would then be placed into another set of query reformulations, and the process described with reference to FIG. 3 above would be applied for the new set that the query reformulation has been placed into.

It is to be understood that when storing the query reformulations, the processor 14 does not necessarily have to store query reformulations into appropriate distinct groups or sets. In an example, the processor 14 may store all of the query reformulations in the database 22 without separating the reformulations into particular groups or sets. In this example, the processor 14 does not have to utilize a particular set when performing the steps of the method, but instead selects query reformulations from the entire bank of query reformulations stored in the database 22.

Referring back to FIG. 2, and in instances where query reformulations are stored in distinct sets in the database 22, the method further includes selecting one of the plurality of sets of query reformulations containing a normalization candidate that matches the search query (as shown in method step 210). Once a set has been selected, the method further includes filtering the selected set of query reformulations (as shown in method step 212). While the selected set of query reformulations includes normalization candidates which are relevant to the present search query, the selected set of query reformulations may still contain redundant, meaningless, and/or irrelevant query reformulations and are considered to be noise.

The filtering step 212 typically involves weeding out or removing at least one query reformulation containing normalization candidates that have an edit distance greater than two letters. Said differently, a query reformulation may be removed if one of its normalization candidates has an edit distance of three or more letters compared to the other normalization candidate of the query reformulation. However, the query reformulation having normalization candidates with an edit distance of two or less words would remain in the selected set of query reformulations. For example, the normalization candidates "hd-tv" and "hdtv" have an edit distance of less than two letters, and therefore the members "hd-tv" and "hdtv" would remain as a query reformulation in the selected set of query reformulations. In another example, the normalization candidates "chair" and "chairs" have an edit distance of less than two letters, and therefore the query reformulation "chair" and "chairs" would remain the selected set of query reformulations. In yet another example, the normalization candidates "shoe" and "sandal" have an edit distance of greater than two letters, and therefore the query reformulation "shoe" and "sandal" would be removed from the selected set of query reformulations.

It is to be understood that the edit distance between the normalization candidates is not fixed at greater than two letters, and may be set to any edit distance desired. Accordingly, and in an example, the edit distance may be greater than one letter, greater than two letters, greater than three letters, etc.

Also during the filtering step 212, the query reformulations which contain normalization candidates that vary based on their spelling are also kept in the set of reformulations. For example, the query reformulation "popcorn" and "ppcorn" may be kept in the set, because "ppcorn" is a misspelling of the word "popcorn". In another example, the query reformulation "ticket" and "tickt" may be kept in the set, because "tickt" is a misspelling of the word "ticket".

In addition, during the filtering step 212, the query reformulations which include one normalization candidate that is a variation of the other normalization candidate are also kept in the set of query reformulations. For example, the query reformulations that contain normalization candidates which are very similar but are represented by different spellings or acronyms or are the plural and singular variations are kept in the set of query reformulations. Examples of such query reformulations include the reformulation "chair" and "chairs", the reformulation "High Density Television" and "Hi-Def TV", and the formulation "hdtv" and "hd-tv".

After filtering, the method further includes the step of tying each normalization candidate of each query reformulation of the selected set of query reformulations to a category (as shown at 214). The categories tiled to the normalization candidates may include a single category (e.g., "Women's clothing") or a set of categories (e.g., a general category and one or more subcategories such as "Women's clothing/women's shirts"). In an example, the processor 14 ties each normalization candidate of each of the query reformulations of the selected set of query reformulations to a category to form a candidate-category pair for each normalization candidate. The category/ies tied to a normalization candidate generally includes a category or set of categories (e.g., a general category and one or more subcategories) that the users tend to engage the most during a web search using a given query (i.e., the normalization candidate). For example, each good, service, and/or topic/point of interest available is typically linked to a particular category path. Accordingly, each time the user selects an icon and/or hyperlink associated with the good, service, and/or topic/point of interest, the specific category path associated with good, service, and/or topic/point of interest may be collected by the processor 14 and stored in the database 22. In an example, each normalization candidate of each query reformulation of the selected set may be tied to a single category. In another example, each normalization candidate of each query reformulation of the selected set may be tied to at least one category. In the later example, each normalization candidate may be tied to a general category or may be tied to a general category and one or more subcategories. For example, a normalization category may be tied to "clothing" as a general category and "Women's clothing" as a subcategory.

In an example, the category or set of categories for each normalization candidate may be determined by utilizing category data collected during a session and stored in the database 22. For example, category data may be used to determine the number of times one or more items is/are selected by the user with the same category as a search query. It is noted that the search query in this example corresponds to (i.e., is the same as) the normalization candidate of the query reformulation. Accordingly, the processor 14 determines the frequency of item(s) selected by the user that has a category that is common with the category of the search query entered. The number of times that an item is selected with the same category is compared to a predetermined threshold. In an example, the predetermined threshold may be about 90%; i.e., about 90% of the time users are selecting item(s) tied to the same category. It is to be understood, however, that the predetermined threshold may be any value as desired.

Once the respective normalization candidates of the plurality of query reformulations of the selected set are tied to a category/ies, the method further includes comparing the categories of the normalization candidates for each query reformulation in the set and removing at least one query reformulation from the set (as shown in 216 in FIG. 2). Based on the comparison performed during the comparing step 216, the method further includes removing at least one query reformulation from the set when the category of one of the normalization candidates is uncommon with the category with the other normalization candidate (as shown in 218 in FIG. 2). For example, the processor 14 compares the respective category/ies of the normalization candidates of each of the query reformulations of the set, and removes the query reformulations having normalization candidates with respective category/ies does/do not match. This is to capture the user's intent when he/she entered a particular search query. In this way, the search results for both of the normalization candidates would not be exactly the same. For instance, for the query reformulation "apple" and "apples", the category tied to the normalization candidate "apple" may be "electronic devices" and the category tied to the normalization candidate "apples" may be "grocery". Since the categories "electronic devices" and "grocery" are different, the query reformulation would be removed from the set. In another example, for the query reformulation "bird" and "birds", the category tied to the normalization candidate "bird" may be "pets" and the category tied to the normalization candidate "birds" may also be "pets". Since the category "pets" is the same for both of the normalization candidates, the query reformulation would stay in the set.

It is to be understood that the normalization candidates of the query reformulations may have a single category or multiple categories. In instances where the normalization candidates have multiple categories, the method may involve comparing the respective multiple categories of the normalization candidate and removing the query reformulation in instances where the at least one of the categories of one of the normalization candidate is uncommon with at least one of the categories of the other normalization candidate. For example, for the query reformulation "battery" and "batteries", the top category tied to the normalization candidate "battery" may be "mobile vehicles" and the subcategory tied to the normalization candidate may be "batteries", and the top categories tied to the normalization candidate "batteries" may be "batteries" and the subcategory tied to the normalization candidate may be "AAA batteries".

Since the subcategory "batteries" tied to the normalization candidate "battery" is common with the top category "batteries" tied to the normalization candidate "batteries". In this instance, the query reformulation "battery" and "batteries" would stay in the set.

It is to be understood that the category filter may be restricted. For example, the category filter may be set so that only the top categories tied to the normalization candidates can match for the query reformulation to remain in the set. Utilizing the example set forth above, since the top category for "battery" is "mobile vehicles" and the top category for "batteries" is "batteries", and the top categories do not match, the query reformulation "battery" and "batteries" would therefore be removed from the set. In another example, the category filter may be restricted by weighting the top category and the subcategories for each normalization candidate of the query reformulation. In this example, the category that is more important may be weighted higher (e.g., the top category may be weighted above 50%) than the category that is less important (e.g., the subcategory may be weighted less than 50%).

The method further includes storing the normalization candidates of the query reformulations remaining after the removing step 218 in the database 22 (as shown at 220 in FIG. 2). The normalization candidates of the remaining query reformulations forms a set of normalization candidates (which is stored in the database 22) as a final set or group of normalization candidates that may be used by the search engine to accurately recall goods, services, and/or topics/points of interest during a web search based on the user's search query.

Due, at least in part, to the large number of possible search queries which may be formulated by the user during searching and the large number of goods, services, and/or topics/points of interest, the method described in detail above is typically performed offline. In addition, since new goods, services, and/or topics/points of interest, as well as new click data becomes available every day, the stemming pair groups may be updated periodically. In one example, the stemming pair groups may be updated daily, such as every morning. It is to be appreciated, however, that the method described above could be implemented to dynamically update the website.

Once the groups of stemming pairs have been created utilizing the examples of the method described above, the groups of stemming pairs may be implemented during web searching by a user. In an example, the user may enter a search query and the website selects and utilizes an appropriate stemming pair group pair stored in the database 22 to generate relevant search results for the user. In an example, if the user enters "apple" as his/her search query, the website selects and utilizes the appropriate stemming pair group to generate search results covering electronic devices manufactured by Apple, Inc., as well as grocery items for apples. This way, the user can scroll through all relevant search results for the term "apple", as the user may not necessarily be looking for electronic devices but instead intended to look for the grocery item apples. This, in effect, produces a more pleasant searching experience for the user.

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure.

What is claimed is:

1. A system for generating normalization candidates for a first search query, the system comprising:
   one or more non-transitory memory storage systems storing computing instructions configured to run on one or more computer processors;
   a database for storing a plurality of session logs with each session log including query data; and
   the one or more computer processors in communication with the database and configured to execute the computing instructions causing the one or more computer processors to:
      analyze the query data of the plurality of session logs to generate a plurality of sets of query reformulations for each of a plurality of search queries;
      select a first set of the plurality of sets of query reformulations containing a normalization candidate that matches the first search query;
      filter the first set of the plurality of sets of query reformulations, as selected, comprising query reformulations of the plurality of sets of query reformulations that appear more than a pre-determined number of times in the plurality of session logs, the query reformulations comprising the normalization candidates that match the first search query, the normalization candidates comprising the normalization candidate;
      tie each of the normalization candidates of each of the first set of the plurality of sets of query reformulations, as selected, to a respective category;
      compare respective categories of the normalization candidates of the each of the first set of the plurality of sets of query reformulations;
      remove at least one query reformulation from the first set of the plurality of sets of query reformulations when the respective category of one of the normalization candidates in the at least one query reformulation is uncommon with the respective categories of other ones of the normalization candidates;
      upon removing the at least one query reformulation from the first set of the plurality of sets of query reformulations, transmit the first set of the plurality of sets of query reformulations, as revised, to a web search engine to replace the first search query; and
      store the normalization candidates of the first set of the plurality of sets of query reformulations remaining in the first set of the plurality of sets of query reformulations in the database.

2. The system of claim 1 wherein the one or more computer processors are further configured to execute the computing instructions causing the one or more computer processors to:
   collect the query data of each of the plurality of session logs from a corresponding session;
   organize the query data into the plurality of session logs; and
   store the plurality of session logs in the database.

3. The system of claim 1 wherein the one or more computer processors configured to execute the computing instructions causing the one or more computer processors to analyze the query data of the plurality of session logs to generate the plurality of sets of query reformulations further comprises the computing instructions causing the one or more computer processors to analyze the query data to determine which of the plurality of sets of query reformulations have a frequency of occurring in the plurality of session logs that match the first search query and that exceeds a predetermined threshold.

4. The system of claim 1 wherein the computing instructions causing the one or more computer processors to filter the first set of the plurality of sets of query reformulations further comprises the computing instructions causing the one or more computer processors to remove at least one of the plurality of sets of query reformulations containing the normalization candidates that have an edit distance of greater than two letters.

5. The system of claim 1 wherein the computing instructions causing the one or more computer processors to filter the first set of the plurality of sets of query reformulations further comprises the computing instructions causing the one or more computer processors to keep at least one of the plurality of sets of query reformulations containing the normalization candidates that vary based on spelling.

6. The system of claim 1 wherein the computing instructions causing the one or more computer processors to filter the first set of the plurality of sets of query reformulations further comprises the computing instructions causing the one or more computer processors to keep at least one of the plurality of sets of query reformulations containing the normalization candidates which are variations of one another.

7. The system of claim 1 wherein the plurality of session logs further includes category data and the computing instructions causing the one or more computer processors to tie each of the normalization candidates of each of the plurality of sets of query reformulations, as selected, to the respective category further comprises the computing instructions causing the one or more computer processors to determine the respective category for the each of the normalization candidates utilizing the category data of the plurality of session logs stored in the database.

8. A method for generating normalization candidates for a first search query being performed utilizing one or more processors comprising:
   analyzing, with a computer system using the one or more processors, query data of a plurality of session logs to generate a plurality of sets of query reformulations for each of a plurality of search queries;
   selecting, with the computer system, a first set of the plurality of sets of query reformulations containing a pair of the normalization candidates with one of the normalization candidates matching the first search query;
   filtering, with the computer system, the first set of the plurality of sets of query reformulations, as selected, comprising query reformulations of the plurality of sets of query reformulations that appear more than a pre-determined number of times in the plurality of session logs, the query reformulations comprising the normalization candidates that match the first search query, the normalization candidates comprising a normalization candidate;
   tying, with the computer system, each of the normalization candidates of each of the first set of the plurality of sets of query reformulations, as selected, to a respective category;
   comparing, with the computer system, respective categories of the normalization candidates of the each of the first set of the plurality of sets of query reformulations;
   removing, with the computer system, at least one query reformulation from the first set of the plurality of sets of query reformulations when the respective category of one of the normalization candidates in the at least one query reformulation is uncommon with the respective categories of other ones of the normalization candidates;

upon removing the at least one query reformulation from the first set of the plurality of sets of query reformulations, transmitting, with the computer system, the first set of the plurality of sets of query reformulations, as revised, to a web search engine to replace the first search query; and storing, with the computer system, the normalization candidates of the first set of the plurality of sets of query reformulations remaining in the first set of the plurality of sets of query reformulations in a database.

9. The method of claim 8 further comprising:
collecting the query data of each of the plurality of session logs from a corresponding session;
organizing the query data into the plurality of session logs; and
storing the plurality of session logs in the database.

10. The method of claim 8 wherein analyzing the query data of the plurality of session logs to generate the plurality of sets of query reformulations further comprises analyzing the query data to determine which of the plurality of sets of query reformulations have a frequency of occurring in the plurality of session logs that match the first search query and that exceeds a predetermined threshold.

11. The method of claim 8 wherein filtering the first set of the plurality of sets of query reformulations further comprises removing at least one of the plurality of sets of query reformulations containing the normalization candidates that have an edit distance of greater than two letters.

12. The method of claim 8 wherein filtering the first set of the plurality of sets of query reformulations further comprises keeping at least one of the plurality of sets of query reformulations containing the normalization candidates that vary based on spelling.

13. The method of claim 8 wherein filtering the first set of the plurality of sets of query reformulations further comprises keeping at least one of the plurality of sets of query reformulations containing the normalization candidates which are variations of one another.

14. The method of claim 8 wherein the plurality of session logs further includes category data and tying each of the normalization candidates of each of the plurality of sets of query reformulations, as selected, set to the respective category further comprises determining the respective category for the each of the normalization candidates utilizing the category data of the plurality of session logs stored in the database.

15. The method of claim 8 wherein analyzing, selecting, filtering, tying, comparing, removing, and storing is performed offline.

16. One or more non-transitory computing storage media having computing instructions embodied thereon and, when executed by one or more processors, comprising:
a database for storing a plurality of session logs with each session log including query data; and
the one or more processors in communication with the database and configured to execute the computing instructions causing the one or more processors to:
analyze the query data of the plurality of session logs to generate a plurality of sets of query reformulations for each of a plurality of search queries;
select a first set of the plurality of sets of query reformulations containing a pair of normalization candidates with one of the normalization candidates matching a first search query;
filter the first set of the plurality of sets of query reformulations, as selected, comprising query reformulations of the plurality of sets of query reformulations that appear more than a pre-determined number of times in the plurality of session logs, the query reformulations comprising the normalization candidates that match the first search query, the normalization candidates comprising a normalization candidate;
tie each of the normalization candidates of each of the first set of the plurality of sets of query reformulations, as selected, to a respective category;
compare respective categories of the normalization candidates of the each of the first set of the plurality of sets of query reformulations;
remove at least one query reformulation from the first set of the plurality of sets of query reformulations when the respective category of one of the normalization candidates in the at least one query reformulation is uncommon with the respective categories of other ones of the normalization candidates;
upon removing the at least one query reformulation from the first set of the plurality of sets of query reformulations, transmitting, with a computer system, the first set of the plurality of sets of query reformulations, as revised, to a web search engine to replace the first search query; and
store the normalization candidates of the first set of the plurality of sets of query reformulations remaining in the first set of the plurality of sets of query reformulations in the database.

17. The one or more non-transitory computing storage media of claim 16, having the computing instructions embodied thereon, wherein the one or more processors are further configured to:
collect the query data of each of the plurality of session logs from a corresponding session;
organize the query data into the plurality of session logs; and
store the plurality of session logs in the database.

18. The one or more non-transitory computing storage media of claim 16, having the computing instructions embodied thereon, wherein the one or more processors configured to execute the computing instructions causing the one or more processors to analyze the query data of the plurality of session logs to generate the plurality of sets of query reformulations further comprises the computing instructions causing the one or more processors to analyze the query data to determine which of the plurality of sets of query reformulations have a frequency of occurring in the plurality of session logs that match the first search query and that exceeds a predetermined threshold.

19. The one or more non-transitory computing storage media of claim 16, having the computing instructions embodied thereon, wherein the computing instructions causing the one or more processors to filter the first set of the plurality of sets of query reformulations, as selected, further comprises the computing instructions causing the one or more processors to remove at least one of the plurality of sets of query reformulations containing the normalization candidates that have an edit distance of greater than two letters.

20. The one or more non-transitory computing storage media of claim 16, having the computing instructions embodied thereon, wherein the computing instructions causing the one or more processors to filter the first set of the plurality of sets of query reformulations, as selected, further comprises the computing instructions causing the one or more processors to keep at least one of the plurality of sets of query reformulations containing the normalization candidates that vary based on spelling.

21. The one or more non-transitory computing storage media of claim 16, having the computing instructions embodied thereon, wherein the computing instructions causing the one or more processors to filter the first set of the plurality of sets of query reformulations, as selected, further comprises the computing instructions causing the one or more processors to keep at least one of the plurality of sets of query reformulations containing the normalization candidates which are variations of one another.

22. The one or more non-transitory computing storage media of claim 16, having the computing instructions embodied thereon, wherein the plurality of session logs further includes category data and the computing instructions causing the one or more processors to tie each of the normalization candidates of each of the plurality of sets of query reformulations, as selected, set to the respective category further comprises the computing instructions causing the one or more processors to determine the respective category for the each of the normalization candidates utilizing the category data of the plurality of session logs stored in the database.

* * * * *